128-24 A AU 336 EX

'/11/83 XR 4,368,410

United States Patent [19]

Hance et al.

[11] 4,368,410

[45] Jan. 11, 1983

[54] ULTRASOUND THERAPY DEVICE

[75] Inventors: Richard D. Hance, Elburn; Edward J. Barsotti, Batavia, both of Ill.

[73] Assignee: DynaWave Corporation, Geneva, Ill.

[21] Appl. No.: 196,647

[22] Filed: Oct. 14, 1980

[51] Int. Cl.[3] .......... H02N 1/00

[52] U.S. Cl. .......... 318/116; 128/24 A

[58] Field of Search .......... 340/248; 310/316; 307/271, 265; 318/116

[56] References Cited

U.S. PATENT DOCUMENTS

| | | | |
|---|---|---|---|
| 3,293,569 | 12/1966 | Eglund et al. | 307/271 |
| 3,489,930 | 1/1970 | Shoh | 310/316 |
| 3,517,220 | 6/1970 | Gibson et al. | 307/265 |
| 3,573,781 | 4/1971 | Shoh | 340/248 |
| 4,302,728 | 10/1981 | Nakamura | 310/316 |

OTHER PUBLICATIONS

Handbook of Operational Amplifier Circuit Design, David F. Stout and Milton Kaufman, McGraw Hill Book Co., 1976, pp. 6-9, Fig. 6-4.

Mettler Electronics Corp. Brochure entitled "Sonicator II", dated Nov. 1979.

Rich-Mar News Release and Pamphlet for the Rich-Mar IV, dated Feb. 5, 1975.

*Primary Examiner*—B. Dobeck

*Assistant Examiner*—S. M. Bergmann

*Attorney, Agent, or Firm*—Hill, Van Santen, Steadman, Chiara & Simpson

[57] ABSTRACT

An ultrasound therapy device is provided which maintains a selected constant electrical drive power to a transducer regardless of the load on said transducer by means of an analog servo feedback circuit. The device is operable in either a continuous or pulsed mode and if operated in the pulsed mode, both the pulse period and the pulse duration can be selected by the operator. Circuitry is provided to prevent the operator from selecting a pulse duration greater than the selected pulse period. Touch pad input switches may be used to input values of the operating parameters, and the chosen parameters may be displayed on digital readouts on the front panel of the device.

20 Claims, 8 Drawing Figures

L.P FILTER
MULT.
MX
A.D.C.
DISPLAY
D.A.C.
F.F.
TO THERMISTOR 129
TO ANALOG DRIVER CIRCUIT J
V
M
J
I
K
H
94
96
96a
98
100
102
103
104
106
108
110
110a
110b
112
113
114
115
116
117
118
119
120
122
124
126
127
128
129
130
131
132
134
134a
134b
135
136
138
139
139a
139b
140
81

ULTRASOUND THERAPY DEVICE

BACKGROUND OF THE INVENTION

1. Field of the Invention

This invention relates to ultrasound therapy devices and more specifically to ultrasound therapy devices capable of functioning in pulsed or continuous modes and having automatic feedback control of transducer power.

2. Description of the Prior Art

Ultrasound therapy medical devices are available which operate in pulsed or continuous modes. In the continuous mode the devices emit an ultrasonic frequency from a transducer which is housed in a hand held applicator. The power supplied by the device to the transducer can be selected by the operator.

The applicator has a generally flat face which is applied against the skin of a patient undergoing treatment. As the operator directs the applicator over the area to be treated, the ultrasonic energy causes the underlying tissue to heat up producing beneficial therapeutic results.

In the pulsed mode, available devices emit the ultrasonic frequency with pulses having either a variable duration or a variable period but not both. In some applications it may be useful to have a high frequency of pulses with a relatively short pulse duration. In other applications, it may be useful to have a low frequency of pulses with a relatively long pulse duration. Also, varying the pulse duration for a given pulse period produces different treatment benefits for the patient. The presently available devices do not provide these functions.

The pulsed mode is used to deliver a higher power to the patient for short repeated intervals than may be desirable during a continuous application. The pulsed mode also allows the blood flow and lymphatic drainage system in the treated tissue of the patient to carry off exudates and other matter in between bursts of ultrasonic energy.

The therapy benefits of ultrasonic energy are dependent not only on a continuous or pulsed mode of application, but also on the level of ultrasonic energy directed to the patient's tissue. This level of energy is dependent on the energy transmitted by the transducer.

As the applicator housed transducer is moved over the patient's skin, the ultrasonic energy is absorbed in fat, bone and muscle tissue. These different types of tissue absorb different amounts of ultrasonic energy and therefore present different load conditions on the transducer.

For a given input voltage to the transducer, under changing load conditions, the output power or energy level of the ultrasonic energy will likewise change. The presently available devices typically supply a constant selected voltage to the transducer despite the load conditions involved. This results in uncertainty as to the actual level of ultrasonic energy being directed to the various portions of the patient's body. More effective treatment may be provided by supplying a known constant energy level of ultrasonic energy to the patient.

Presently available devices do not have any means for monitoring the transducer for various conditions such as open or short circuits, overheating or deterioration. Thus, errors of this type, which may be undetected by the operator and the patient, may result in improper treatment to the patient.

Additionally, presently available devices present output information to the operator in the imprecise form of analog meters, mechanical rotary switches and mechanical timers.

SUMMARY OF THE INVENTION

The present invention provides for an ultrasonic therapy device which overcomes several deficiencies in prior devices and resolves several problems left unsolved by the prior devices.

Specifically, the invention provides for an ultrasonic therapy device which operates selectively in either a continuous or pulsed mode. In both modes, current and voltage level samples from the transducer input are used in a negative feedback circuit to control the exact output of power to the transducer as the loading conditions on the transducer change. These current and voltage samples are used to compute the actual power delivered to the transducer which is displayed in a digital format on the front panel of the device.

When the device is being operated in the pulsed mode, the operator is able to select not only the pulse period, but also the pulse duration. This permits a pulse duration to be chosen in the range of 10 milliseconds to the length of the pulse period for any pulse period selected. The pulse period may be chosen in the range of 10–500 milliseconds.

The inventive apparatus includes a master timing circuit which provides clock pulses; switches accessible to the operator for specifying the operational parameters, power or intensity level, continuous or pulsed mode of operation, pulse period, pulse duration, and treatment time; a display which displays the selected values in digital form; a set of registers which receive the operator specified parameters; digital control unit and an analog closed loop control system which compares the instantaneous power output to a transducer to the operator selected power to minimize any difference therebetween.

The front panel input switches may be touch pad switches requiring only a touch by the operator to activate the switch. With this type of switch, setting clock circuits are provided which use a clock pulse from the master timer to accept signals from the touch switches to increment or decrement the input parameters.

The treatment time is selected by the operator by use of appropriate touch pad switches. When the treatment time is increased above zero, the power or intensity level may be selected by the operator and will be supplied to the transducer. The operator can also choose between a pulsed or continuous supply of power to the transducer. The selected power or intensity level is supplied to the transducer until the treatment time circuit counts down to zero, at which point the power output is terminated.

If the pulsed mode is chosen, a digital synchronization circuit is provided which supplies power to the transducer during the length of the pulse duration and then terminates power for the remainder of the pulse period. Both pulse duration and pulse period parameters may be adjusted by the operator, independently of each other. A comparator circuit is provided to ensure that the operator does not select a pulse duration greater than the pulse period.

In either mode of operation, feedback signals representating current and voltage drawn by the transducer are supplied to an analog multiplier where the actual power supplied to the transducer is calculated.

This power level is used as negative feedback in conjunction with the operator selected power level to maintain the output power level supplied constant and equal to the power level requested.

Reference voltage and current levels are used in the error detection circuitry which monitors the voltage and current supplied to the transducer and the temperature of the transducer. Comparators are used to supply error signals if an open circuit, short circuit or overheating of the transducer is detected.

In use, the operator may turn the device on, select continuous or pulsed mode, and if pulsed mode, select the pulse period and pulse duration, set the treatment time and select a power or intensity level, all by the use of electrical touch pad switches. Digital displays are provided adjacent each associated group of touch pads for positive and precise selection of the operational parameters.

A method of optimizing the quantity of power supplied to an ultrasonic transducer comprises the steps of:

1. Sensing a manually selected, desired output level,
2. Generating an output voltage and supplying that output voltage to the ultrasonic transducer.
3. Sensing the instantaneous output voltage and current,
4. Instantaneously forming the value of an output power as a function of the instantaneous output current and voltage,
5. Continuously comparing the actual value of output power to the sensed, selected, desired power level,
6. Adjusting the generated output voltage to minimize the differences between the selected and the output power levels.

In a pulsed mode, the method further comprises the steps of:

1. Sensing a manually selected repetition rate,
2. Sensing a manually selected pulse width within the repetition rate,
3. Repetitously enabling generation of the output voltage at a rate corresponding to the sensed repetition rate but only for a period of time corresponding to the sensed pulse width.

DESCRIPTION OF THE PREFERRED EMBODIMENTS

Not by way of limitation, but by way of disclosing the best mode and by way of enabling one of ordinary skill in the art to practice our invention, FIGS. 1–8 show an illustrative use of our invention.

Figure 1:
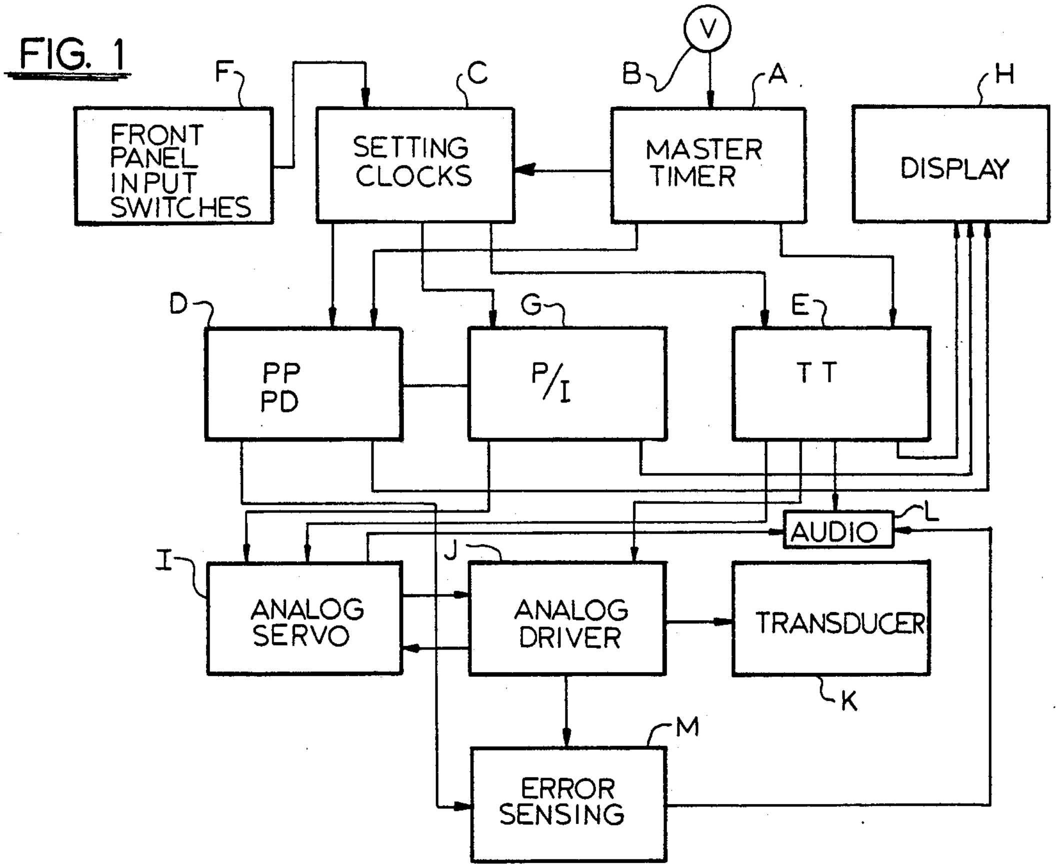
FIG. 1 is a functional block diagram of the circuits contained in an illustrative embodiment of the present invention.

In the diagram of FIG. 1 is shown the interconnection of the operational circuits.

A master timer circuit A is supplied with the electrical power from a voltage source B and in turn supplies signals of various frequencies to a setting clocks circuit C, a Pulse Duration (PD) and Pulse Period (PP) circuit D and a Treatment Time (TT) circuit E.

Front panel switches F provide input information from the operator which is supplied to the setting clocks circuit C for setting the operational parameters in the PP and PD circuit D, the Power/Intensity (P/I) circuit G and the TT circuit E.

The PP, PD and TT values are supplied to a display H on the front panel of the device.

If the pulsed mode of operation is chosen, a signal is supplied from the PP-PD circuit D to the P/I circuit G so that power is supplied to a transducer K only during the pulse portion of the PP. The requested power from the front panel switches F and supplied to the P/I circuit is transmitted to an analog servo circuit I. This requested power is compared with a power signal sensed by an analog driver circuit J and appropriate adjustments are made to maintain a constant power supply to the transducer K by the analog driver circuit J.

An output signal from the TT circuit removes power supplied to the transducer K when the treatment period ends.

An audio signal circuit L sounds a warning during the last six seconds of TT, and if an error is detected by an error sensing circuit M. It also provides audio confirmation that a touch switch has been activated.

The specifics of each circuit will now be described in greater detail.

Figure 2:
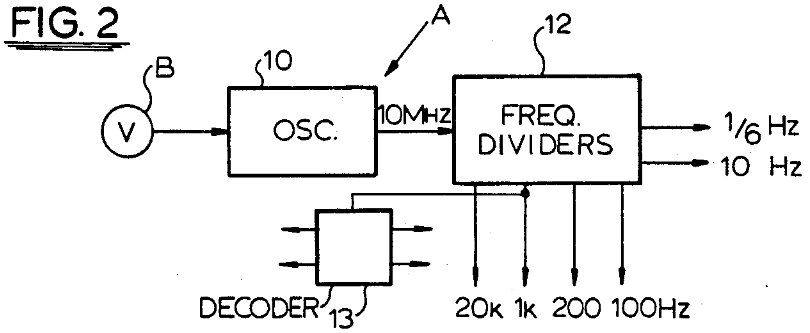
FIG. 2 is a functional block diagram of the master timer circuit.

FIG. 2 shows in detail the master timer circuit A which provides all the timing signals to synchronize system operation. A basic clock frequency of 10 MHz. is provided by a stable monolithic oscillator 10 such as an XD-33D10. This frequency is divided down by a frequency divider 12, comprised of a series of LS90s and an LS92, and the desired timing signals are either decoded or taken directly from taps in the divider chain. Specific frequency values required in the system are 20 KHz., 1 KHZ., 200 Hz., 100 Hz., 10 Hz., and 1/6 Hz. The 1 KHz. signal is decoded by a decoder 13 such as an LS138 to provide for separate one-millisecond timing signals during each ten millisecond period.

Figure 3A:
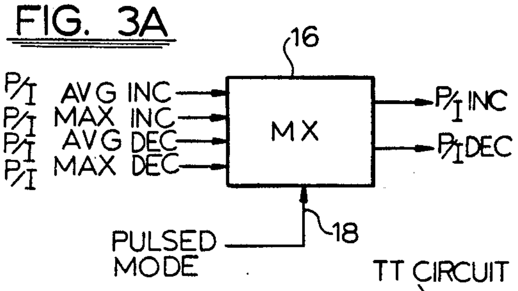
FIG. 3A is a schematic diagram of the multiplexer circuit.
Figure 3:
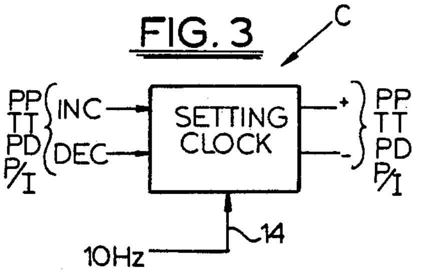
FIG. 3 is a functional block diagram of the setting clocks circuits.

As seen in FIG. 3, information from the front panel switches F signaling an increase or a decrease and an appropriate timing signal 14 such as 10 Hz. are used in combination in the setting clocks circuit C to set the operational parameters, TT, P/I, PP and PD. This is done by using two LS74 flip-flops, an LS123 flip-flop and a plurality of gates.

Touch control switches may be utilized to change parameters requiring that the operator need only touch the appropriate pad on the front panel. A momentary touch will produce a change of one unit. If contact is maintained with the touch pad, the setting clocks logic will begin to auto-increment or decrement at a frequency of 10 changes per second, controlled by the timing signal 14.

Four identical circuits are used in the setting clocks circuit C, one for each of the parameters: PP, PD, TT and P/I. Since the P/I average setting is used only in the continuous mode, it is seen in FIG. 3A that only two of these four inputs (increase and decrease of both the average and maximum) are chosen as outputs by a multiplexer 16 such as an LS157 which receives a signal on a line 18 from the front panel switches F identifying which mode has been chosen. The output from the multiplexer 16 is then supplied to one of the four identical circuits of FIG. 3 described above. The output from the setting clocks logic circuits C is supplied to the PD-PP circuit D, the P/I circuit G and the TT circuit E.

Figure 4:
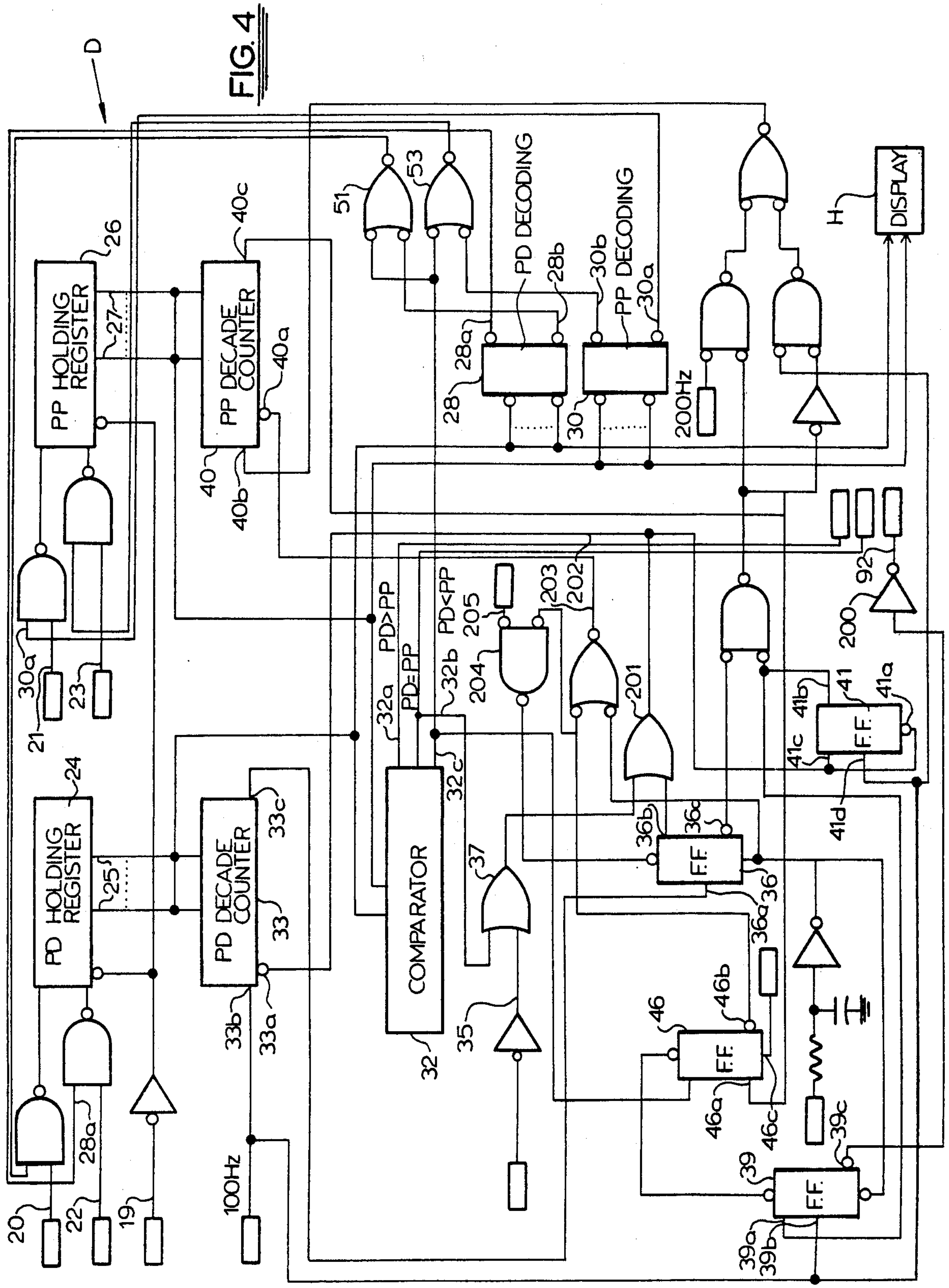
FIG. 4 is a schematic diagram, partly in functional block diagram form, of the Pulse Period and Pulse Duration circuit.

The PD-PP circuit D is shown in FIG. 4. When the power to the ultrasound device is turned on by the operator, a signal is received at line 19 which resets to zero a holding register 24, comprising a pair of counters such as LS192, for the PD and a second holding register 26, also comprising a pair of counters such as LS192, for the PP.

The operator may select appropriate PD and PP by using the front panel switches F which in turn send signals through the PD setting clock circuit C on lines 20 and 22 to signal an increase or decrease in the PD parameter value and through the PP setting clock circuit C on lines 21 and 23 to signal an increase or decrease in the PP parameter value.

The value of the PD parameter chosen is routed in digital form to the display circuit H on output lines 25 from the PD holding register 24. The value of the PP parameter chosen is routed in digital form to the display circuit H on output lines 27 from the PP holding register 26.

The value of the PD and PP parameters chosen is also routed to a digital comparator circuit 32 such as a pair of LS85 comparators where the value of PD is compared with the PP to determine if PD is less than, equal to, or greater than PP.

If PD is greater than PP, an error condition results and the output on lines **32*a*** causes an audible and visible signal to be sent to the operator and the increase in PD is ignored in that the duration of a pulse cannot be longer than the period.

If PD is equal to PP, a signal is sent on output line **32*b* which is gated with a signal from line 35 which signifies that the pulsed mode has not been chosen by the operator. By means of gate 37, the PD=PP signal on line 32*b*** forces the device output from operating in the pulsed mode since when PD equals PP, the output to the transducer K is on continuously.

If PD is less than PP, a signal is sent on output line **32*c* which is gated with the output signals from a pair of decoding circuits 28 and 30. These decoding circuits may be comprised of a pair of LS138 decoders. The values of the PD and PP parameters chosen are routed on lines 25 and 27 to the decoding circuits 28 and 30 where upper and lower limits for a range of values for PD and PP are established. When the register 24 stores the lower limit for the value of the PD parameter, the decoding circuit 28 sends a signal on line 28*a* which is gated with a signal on input line 22 preventing the PD parameter from being decreased by the operator. When the register 26 stores the upper limit for the value of the PP, the decoding circuit 30 sends a signal on line 30*a* which is gated with a signal on input line 21** preventing the PP parameter from being increased by the operator.

As long as the operator has not chosen the upper limit for PD, a signal is sent on line **28*b* and is gated with the output signal from the comparator circuit 32 on line 32*c*. The resulting signal from gate 51 is gated with the input signal on line 20 allowing the operator to increase the value of the PD parameter as long as the upper limit for PD has not been chosen and as long as PD is less than PP. Similarly, as long as the operator has not chosen the lower limit for PP, a signal is sent on line 30*b* which is gated with the output signal from the comparator circuit 32 on line 32*c*. The resulting signal from gate 53 is gated with the input signal on line 22** allowing the operator to decrease the value of the PP parameter as long as the lower limit for PP has not been chosen and as long as PD is less than PP.

A synchronization system consisting of a combination of four flip-flops 36, 39, 41, 46, such as LS74 flip-flops and gating circuits, controls the loading of the selected values for PD and PP from the holding registers 24, 26 into decade counters 33, 40. The decade counters 33, 40 may be LS192 counters. When appropriate signals as described below are received at inputs **33*a*, 40*a*, the decade counters 33, 40 are loaded with the selected values from the registers 24, 26**.

Identical clock pulse counting signals are supplied to inputs **33*b*, 40*b* which count down the decade counters 33, 40 to zero. PD decade counter 33 is the first to reach zero, PD being smaller than PP, and when it does, a signal is sent on line 33*c* to clock input 36*a* of flip-flop 36 causing the output at pin 36*b* to go low. This low signal is supplied through a gate 201 to reset pin 41*a* of flip-flop 41 to cause the output at pin 41*b* to go low. This low signal is supplied to D input 39*a* of flip-flop 39 and upon the next clock pulse signal supplied to clock input 39*b*, the output at pin 39*c* will go high. This high signal is supplied to an inverter 200 which causes the enabling signal on line 92 to go low. This line 92** connects with the P/I circuit G and a low signal on this line prevents power from being supplied to the analog servo circuit I, thus cutting off power to the transducer K.

When the output from pin **36*b* goes low as described above, the low output signal from gate 201 is also sent on a line 202 to input 33*a* to load the decade counter 33. However, as long as the signal on line 202 is low, the counter 33** is prevented from counting down.

After counter 33 has reached zero, PP counter 40 continues to count down. When PP counter 40 reaches zero, a signal is sent on line **40*c* to clock input 46*a* of flip-flop 46 causing the output at pin 46*b* to go low. This low signal is sent on line 203 to load the counter 40. Counter 40 is held in its load condition until flip-flop 46 is reset by an appropriate clock pulse described below at pin 46*c***.

The low signal from pin **46*b* is also sent to gate 204, but this gate does not pass the signal until an appropriate clock pulse described below from line 205 is received. When the clock pulse, being the third decoded 1 KHz. pulse from the master time circuit A arrives on line 205, flip-flop 36 is set causing the output from pin 36*b* to go high and removing the load signal on line 202. When the next 100 Hz. clock pulse is received at input 33*b*, the PD counter will begin to count down. The high signal from pin 36*b* is supplied to D input pin 41*c* of flip-flop 41 causing the output at pin 41*b* to go high. Upon the next 100 Hz. clock pulse received at clock pin 41*d*, this high signal is supplied to input 39*a*** and upon the next 100 Hz.

clock pulse received at clock pin 39b, the output at pin 39c will go low. This low signal passes through inverter 200 causing the enabling signal at line 92 to go high, thereby turning on power to the transducer K.

When the appropriate clock pulse, being the fourth decoded 1 KHz. pulse from the master timer circuit A is received at pin 46c, flip-flop 46 is reset causing the output at pin 46b to go high. This high signal removes the load signal from line 203 allowing the PP counter 40 to begin counting down upon the next 100 Hz. clock pulse to input 40b thus repeating the cycle.

It is thus seen that the counters 33 and 40 are initially loaded and begin counting down together. In this state, the output enabling signal on line 92 is high, thus allowing power to be sent to the transducer K. PD counter 33 is first to reach zero, and when it does, it is loaded and held in a loading condition and the enabling signal on line 92 is switched to low, thus terminating the power supply to the transducer. When the PP counter 40 reaches zero, it reloads and appropriate timing signals are employed to remove the load signals to the counters 33 and 40 sequentially. The enabling signal on line 92 is switched back to high, returning power supply to the transducer, and both counters begin counting down toward zero again, all upon receiving the next 100 Hz. pulse from the master timer circuit A.

Figure 5:
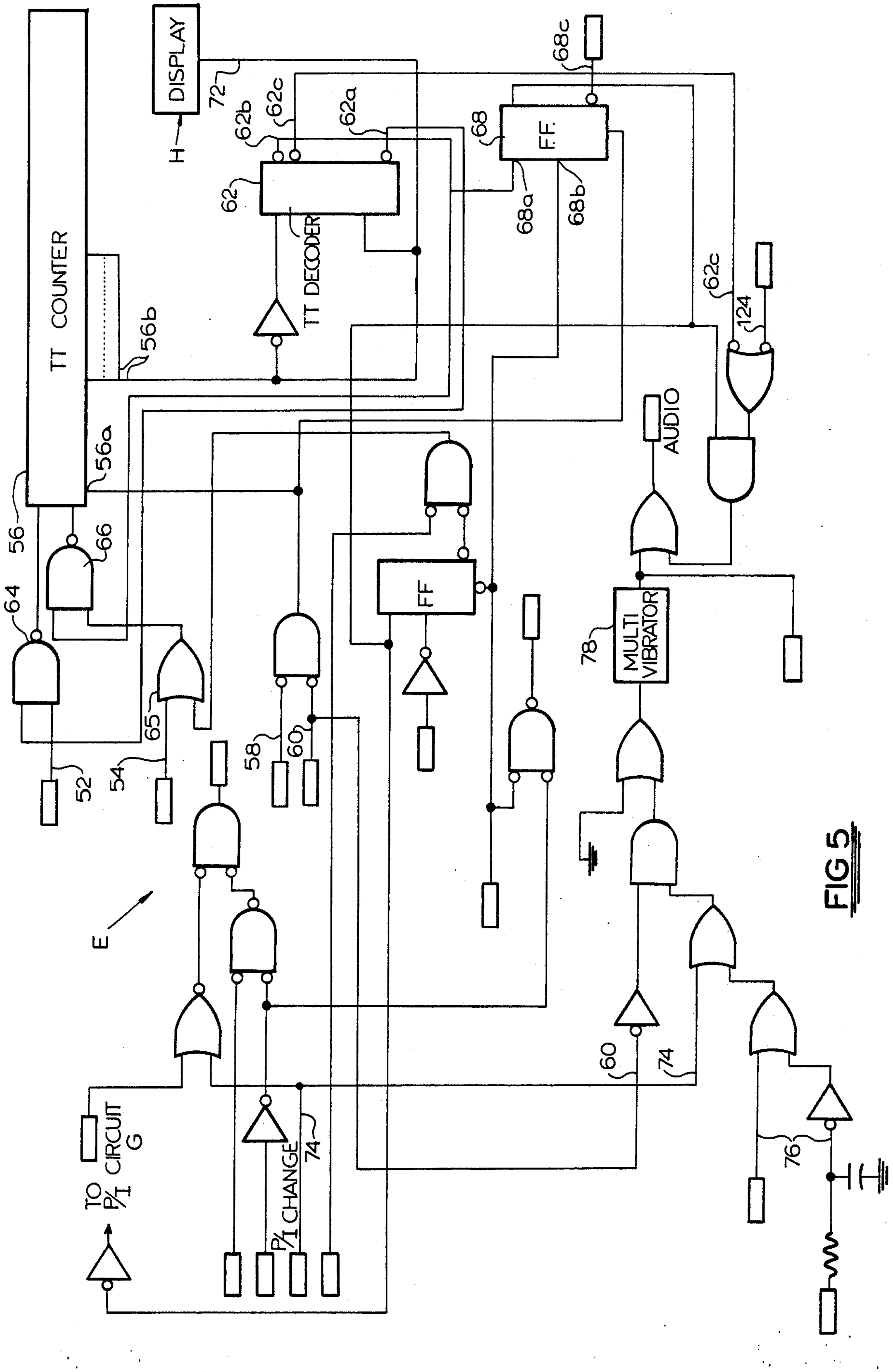
FIG. 5 is a schematic diagram, partly in functional block diagram form, of the Treatment Time circuit and the Audio Warning circuit.

The TT circuit E is shown in FIG. 5. Digital signals on input lines 52, 54 from the TT setting clock circuit C are loaded into a counting circuit 56 which can be comprised of three LS192 counters through gates 64, 65, 66 to increase or decrease TT. The TT counting circuit 56 can be reset to zero by a signal on a line 58 from the TT reset switch on the front panel F or by turning the power to the device off which changes a signal on a line 60. Both signals are gated to input 56a of the counting circuit 56.

The information from counting circuit 56 is sent through output lines 56b to a decoder circuit 62 which can be an LS138 decoder. The decoder circuit 62 checks to see if the value of TT is 60, 0.1 or 0. If the value is 60 (meaning 60 minutes), a signal is sent on a line 62a to a gate 64 preventing the operator from increasing the value of TT in the counting circuit 56. If the value of TT is 0, a signal is sent on a line 62b to a gate 66 preventing the operator from decreasing the value of TT. Also, if the value is 0, a signal is sent to a D input pin 68a of a flip-flop 68 such as an LS74 flip-flop. Upon receiving an appropriate timing signal at clock input 68b, flip-flop 68 sends a signal on a line 68c to other circuits to cease operation of the device. If the value of TT is 0.1, that is, 6 seconds, then a signal is sent on a line 62c to the audio device L to warn the operator that the TT is nearly over.

The counting circuit 56 also sends a digital signal on a line 72 to the display H on the front panel of the device.

The audio device L is energized by various other inputs. Also seen in FIG. 5, the other inputs are produced by P/I change producing a signal on a line 74, touching a touch switch pad producing a signal on a line 76, turning the power on, producing a signal on a line 60, and a calibration error producing a signal on a line 124. A one-shot multivibrator 78 such as an LS123 is provided to cause a single short tone from the audio device L for audibly signaling a change in P/I, touching a switch or turning the power on.

Figure 6:
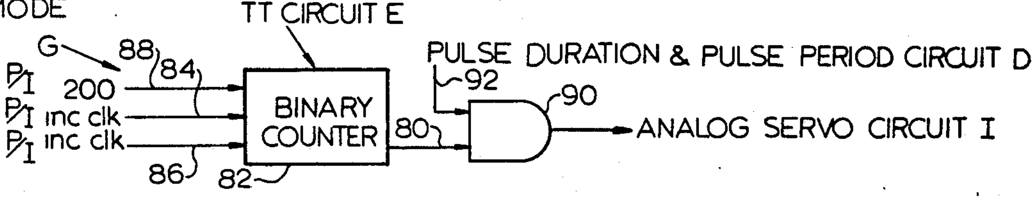
FIG. 6 is a functional block diagram of the Power/Intensity circuit.

The P/I circuit G is shown in FIG. 6.

To control the power or intensity, the digital output signals of a binary counter 82 such as a series of LS193 counters are sent on lines 80 through gates 90 to the analog servo circuit I where they are converted to an analog voltage level. The counter 82 can be incremented or decremented by digital signals on lines 84 and 86 from the P/I setting clocks circuit C. The power or intensity level cannot be increased above a preselected limit which is supplied to the counter 82 on a line 88. The touch pad switches F originate the signals which serve to increase or decrease the binary count and thus the power or intensity level.

The signals from the binary counter 82 sent on lines 80 to the analog servo circuit I are gated on and off at gates 90 by a signal on a line 92 from the PP-PD circuit D. The signal on line 92 is always high while the device is being operated in the continuous mode, but is high only during the PD portion of the PP when the pulse mode is selected as described above in the discussion of the PD-PP circuit D.

Figures 7, 8:
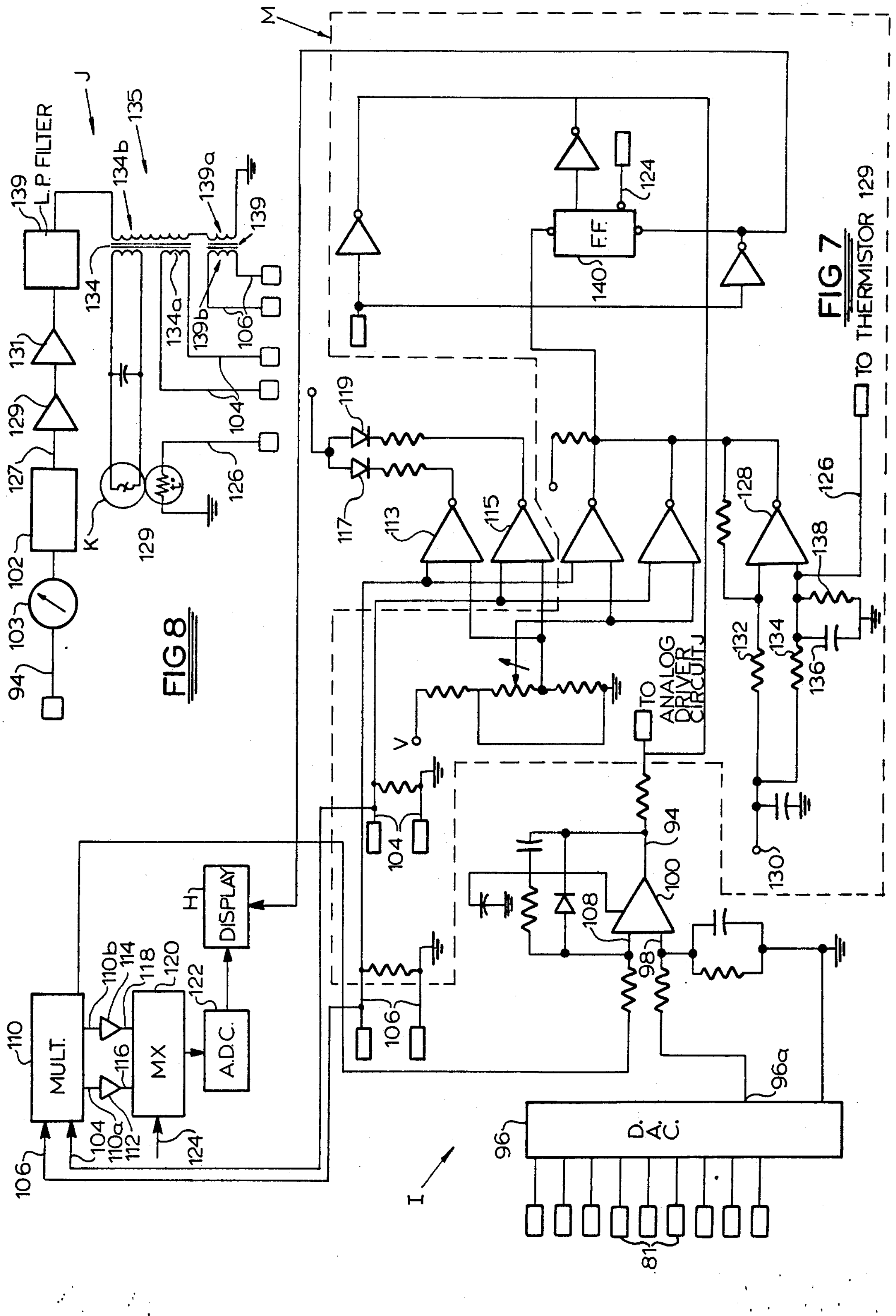
FIG. 7 is a schematic diagram, partly in functional block diagram form, of the Analog Servo circuit and the Error Sensing circuit.
FIG. 8 is a schematic diagram, partly in functional block diagram form, of the Analog Driver circuit.

The analog servo circuit I is shown in FIG. 7. The analog servo circuit I converts the information from the P/I circuit G supplied from lines 81, by means of a digital to analog converter 96 such as a DAC-03 BDX1, into a voltage output on line 96a which is supplied as one input to an operational amplifier circuit 100, such as an AD741J amplifier, the output of which is fed on line 94 to the analog driver circuit J where it drives an oscillator 102.

Feedback signals on lines 104 and 106 from the analog driver circuit J proportional to the transducer voltage and current are returned to the analog servo circuit I, and a voltage representing true power is calculated and delivered on line 108 by an integrated multiplier circuit 110 such as a MC1495L multiplier. This voltage is supplied as another input to the operational amplifier circuit 100.

If the output power represented by the voltage level on line 108 tends to increase above that requested, represented by the voltage level on line 98, due to less load on the transducer K, the increased voltage on line 108 serves as a negative feedback and decreases the drive signal on line 94 to the analog drive circuit J. Likewise, if the power decreases below that requested, due to increased load, the negative feedback increases the drive signal on line 94.

The actual power delivered to the transducer K is measured by the integrated analog multiplier circuit 110 as the product of the instantaneous transducer voltage and current from lines 104 and 106. The present invention contemplates using a high frequency multiplier 110 which accurately measures power from transducer voltage and current feedback circuitry regardless of phase shifts between the two parameters. This feature is important because actual power is equal to RMS current multiplied by RMS voltage multiplied by the cosine of the phase angle between the two parameters. Without this accurate measuring system it is probable that erroneous readings of electrical energy into the transducer would result. The operational amplifier circuit 100 monitors the varying impedance of the transducer K and compensates for it by varying the amplitude of the drive signal on line 94 to the transducer K. Thus an essentially pure sinusoidal wave of a constant amplitude for a given load is produced which drives the transducer K. This wave form is provided under constant or changing load conditions on the transducer K and the output is not subject to a 120 Hz. small amplitube change which affects the output of presently available non-feedback ultrasound devices.

The calculated power signal from the integrated multiplier circuit 110 is fed on lines 110a and 110b to two separate operational amplifiers 112, 114, such as AD741J amplifiers each having adjustable gain. One is for scaling the signal for a power reading, and one is for scaling the signal for an intensity reading. The output lines 116, 118 of the power and intensity amplifiers 112 and 144 are fed to an analog switch or multiplex 120 such as an AD7512DIJN multiplexer where one signal is selected and fed to an analog to digital converter 122 such as an ADC-EK8B converter. Selection of power or intensity is controlled by a signal on line 124 generated by the operator through the front panel switches F. The selected signal is digitized in the analog to digital converter 122 and the resulting digital signals are sent to the display H on the front panel of the device.

The feedback signals on lines 104, 106 from the transducer K used in the multiplier circuit 110 are also compared for magnitude with reference levels in an error sensing circuit M also shown in FIG. 7. If the magnitude of either one exceeds a fixed reference voltage, an error condition exists and the error sensing circuit M reacts by removing the drive voltage on line 94 to the analog driver circuit J and by sending a calibration error signal on line 124 to the other circuits.

Transducer head temperature is monitored by means of a thermistor 129 mounted on the transducer. A voltage source connected to terminal 130 is supplied through a 1.5 M ohm resistor 132 to one input of an operational amplifier 128 and through the thermistor 129 to ground through connection line 126. The voltage source 130 is also connected to a 2 K ohm resistor 134 which has a 0.1 microfarad capacitor 136 and 68 ohm resistor 138 in parallel to ground and then to the other input of the operational amplifier 128.

When the thermistor 129 has a high resistance, that is, when it is cool, the voltage supplied to the inverting input of the operational amplifier 128 is greater than that supplied to the non-inverting input. As the thermistor 129 heats up, its resistance drops and the voltage supplied to the non-inverting input is increased. When the temperature of the thermistor 129 reaches a preselected value, with the described components the value is 50° C., the output of the operational amplifier 128 goes low, resetting flip-flop 140 and causing a signal to be sent by flip-flop 140 on line 124 representing an error. This error will be treated exactly the same as the voltage or current error, that is, the drive voltage on line 94 to the analog driver circuit J will be removed, and the error signal on line 124 will be sent to the other circuits.

The analog driver circuit J is shown in FIG. 8. The analog driver circuit J responds to the control signal on the line 94 from the analog servo circuit I and provides a nominal 1 MHz. ultrasound frequency to the transducer K tuned to the most efficient frequency for the transducer K.

The excitation voltage on line 94 from the analog servo circuit powers the adjustable frequency oscillator 102 which may be a Colpitts oscillator having a manually adjustable impedance at 103. The output voltage swing on line 127 from the oscillator 102 is responsive to the dc level of the excitation voltage on line 94. The oscillator output on line 127 is coupled to a stable, high impedance buffer amplifier 129, which is coupled to a class AB push-pull solid state power amplifier 131. From the power amplifier 131, the signal is passed through a low pass filter 133 and is transformer coupled through an output circuit 135 to the transducer K.

The transducer K is comprised of a crystal, transformer and a front coupler housed in an applicator to be applied against the skin of the patient.

In the output circuit 135, samples are taken of the transducer voltage and current. This is accomplished by providing an extra secondary winding 134a having 2 turns on the transformer 134 which has a primary winding 134b having 30 turns to supply a signal proportional to voltage. A current transformer 139 having its primary winding 139a having 1 turn and connected in series with the primary winding 134b of the transformer 134 and a secondary winding 139b having 24 turns supplies a signal proportional to current. The signals representative of voltage and current are sent to the analog servo circuit I on lines 104 and 106 where they are used to compute real power for feedback to the control circuit 100 and for display to the operator.

The feedback signals on lines 104 and 106 are also used to adjust the operating frequency of the oscillator 102. The output circuitry 135 produces current and voltage samples on lines 104 and 106 of identical amplitude when the frequency is correct for efficient use of the transducer K. These voltage and current samples are compared with a small reference voltage in the analog servo circuit I by a pair of components 113, 115 such as MC3433P. The comparators 113, 115 drive light emitting diodes 117, 119 such as MV5074. The LEDs 117, 119 light when a small output power level is reached, and remain lit for any greater power levels. The frequency adjustment is made by adjusting the variable impedance at 103 while watching the LEDs 117, 119. When an increase in power lights both LEDs 117, 119 at the same time, with the same intensity, the frequency is correct.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A device to be used for delivering ultrasonic therapy to the tissue of a human body wherein said tissue has changing load characteristics, comprising:

a transducer for converting electrical power into ultrasound power, manually operable input means, a source of electrical power, connecting means for selectively connecting said power source to said transducer, timing means connected to and responsive to said manually operable input means for controlling said connecting means to apply electrical power to said transducer for a predetermined time, and power setting means connected to and responsive to said manually operable input means, and connected to said connected means for controlling the level of power supplied to said transducer from said source, and feedback means connected to said transducer for determining the electrical power used by said transducer, comprising means for monitoring the voltage and current signals delivered to said transducer and means for multiplying said signals to calculate power, and connected to said connecting means for adjusting the electrical power supplied to the transducer in response to said changing tissue loads.

2. A device to be used for delivering ultrasonic therapy to the tissue of a human body wherein said tissue has changing load characteristics, comprising:

a transducer for converting electrical power into ultrasound power, manually operable input means, a source of electrical power, connecting means for selectively connecting said power source to said transducer, timing means connected to and responsive to said manually operable input means for controlling said connecting means to apply electrical power to said transducer for a predetermined time, and power setting means connected to and responsive to said manually operable input means, and connected to said connecting means for controlling the level of power supplied to said transducer from said source, and control means connected to and responsive to said manually operable input means for controlling the pulse duration and pulse period of the electrical power supplied by said connecting means to said transducer.

3. A device to be used for delivering ultrasonic therapy to the tissue of a human body wherein said tissue has changing load characteristics, comprising:

means for establishing a desired pulse period, means for establishing a desired pulse duration within said pulse period, means for establising a desired level of output power, means for generating output power pulses to be repetitively supplied to an ultrasonic transducer during the established pulse duration, means for continuously sensing instantaneous output voltage and current, means for continuously forming a feedback signal proportional to a product of said instantaneous output voltage and current, means for comparing said established desired level of output power to said feedback signal including means for generating an error signal proportional thereto, means for adjusting said output pulses to minimize said error signal in response to said changing tissue loads.

4. A device to be used for delivering ultrasonic therapy to the tissue of a human body wherein said tissue has changing load characteristics, comprising:

means for establishing a desired level of output power, means for generating output power to be supplied to an ultrasonic transducer, means for continuously sensing the instantaneous output voltage and current, means for continuously forming a feedback signal proportional to the product of said instantaneous output voltage and current, means for comparing said established desired level of output power to said feedback signal including means for generating an error signal proportional thereto, means for adjusting said output power to minimize said error signal in response to said changing tissue loads.

5. The ultrasonic therapy device of claim 3 wherein: said means for establishing a desired pulse duration comprises digital means for counting.

6. The ultrasonic therapy device of claim 3 wherein: said means for generating output power pulses comprises, adjustable means for generating an essentially sinusoidal output voltage of a selected frequency.

7. The ultrasonic therapy device of claim 6, wherein said means for continuously forming a feedback signal comprises:

analog means for multiplying the sensed instantaneous output current and voltage together to form the product thereof, and wherein said means for comparing comprises:

an analog means for comparing.

8. The ultrasonic therapy device according to claim 7, wherein said means for adjusting is connected to said adjustable means for generating an essentially sinusoidal voltage and is adapted to vary the amplitude of said essentially sinusoidal voltage in response to sensing said error signal.

9. A pulsed ultrasonic therapy device comprising:

means for establishing a desired pulse, means for establishing a desired pulse duration within said pulse, means for establishing a desired level of output power, means for generating output power pulses comprising adjustable means for generating an essentially sinusoidal output voltage of a selected frequency, to be repetitively supplied to an ultrasonic transducer during the established pulse duration, means for continuously sensing instantaneous output voltage and current, means for continuously forming a feedback signal proportional to a product of said instantaneous output voltage and current, comprising analog means for multiplying the sensed instantaneous output current and voltage together to form the product thereof;

means for comparing said established desired level of output power to said feedback signal including means for generating an error signal proportional thereto, wherein said means for comparing comprises an analog means for comparing, means for adjusting said output pulses to minimize said error signal wherein said means for adjusting is connected to said adjustable means for generating and essentially sinusoidal voltage and is adapted to vary the amplitude of said essentially sinusoidal voltage in response to sensing said error signal, and adjustable means for calibrating, including first and second light emitting means, said means for calibrating is adapted to be adjusted and to vary the amplitude of said instantaneous output current and voltage such that when the instantaneous output current and voltage have essentially the same amplitude, said first and second light emitting means will be energized simultaneously.

10. The ultrasonic device according to claim 9, wherein said means for calibrating adjusts said selected frequency of said essentially sinusoidal output voltage.

11. A control system for supplying a selected level of output power, on a repetitive basis to a changing load comprising:
means for selecting the desired level of output power,
means for selecting a desired repetition rate,
means for selecting a time duration within said repetition rate to generate the desired level of output power,
means for generating essentially sinusoidal output voltage and current to be supplied to the load,
means for instantaneously sensing said essentially sinusoidal output voltage and current and for instantaneously forming a feedback signal proportional to the product thereof corresponding to actual output power,
means for comparing said formed feedback signal to said selected level of output power including means for forming an error signal proportional thereto, and
means for sensing said error signal and for adjusting said means for generating to minimize differences between said selected output power and the actual output power in response to said changing load.

12. A control system for supplying a selected level of output power, on a repetitive basis to a load comprising:
means for selecting the desired level of output power,
means for selecting a desired repetition rate,
means for selecting a time duration within said repetition rate to generate the desired level of output power,
means for generating essentially sinusoidal output voltage and current to be supplied to the load,
means for instantaneously sensing said essentially sinusoidal output voltage and current and for instantaneously forming a feedback signal proportional to the product thereof corresponding to actual output power,
means for comparing said formed feedback signal to said selected level of output power including means for forming an error signal proportional thereto, and
means for sensing said error signal and for adjusting said means for generating to minimize differences between said selected output power and the actual output power,
frequency calibration means adapted to adjust the output voltage and current to have essentially the same peak amplitudes,
visual means connected to said calibration means and adapted to provide a visual indication of when said output current and voltage feedback have the same amplitude.

13. A method of optimizing the quantity of power supplied to an ultrasonic transducer comprising the steps of:
sensing a manually selected, desired power level,
generating an output voltage and current and supplying that output voltage and current to the ultrasonic transducer,
sensing the instantaneous output voltage and current,
instantaneously forming the value of output power as a function of the instantaneous output current and voltage,
continuously comparing the actual value of output power to the sensed, selected, desired power level,
adjusting the generated output voltage to minimize the differences between the selected and the output power levels.

14. The method according to claim 13, including the further steps of:
manually selecting and electronically sensing a first output voltage and current repetition rate for pulsed generation of said output voltage and current,
manually selecting and electronically sensing a pulse width for said pulsed generation of said output voltage and current limiting generation of the output voltage and current to a period of time corresponding to the sensed pulse width, and
periodically repeatedly generating said limited output voltage and current at said first repetition rate.

15. The method according to claim 14, wherein the step of generating comprises:
generating an essentially sinusoidal output voltage and current of a selected frequency.

16. A device to be used for delivering ultrasonic therapy to the tissue of a human body wherein said tissue has changing load characteristics, comprising:
a transducer for converting electrical power into ultrasound power,
manually operable input means,
a source of electrical power,
connecting means for selectively connecting said power source to said transducer,
timing means connected to and responsive to said manually operable input means for controlling said connecting means to apply electrical power to said transducer for a predetermined time, and
power setting means connected to and responsive to said manually operable input means, and connected to said connecting means for controlling the level of power supplied to said transducer from said source, and
control means connected to and responsive to said manually operable input means for controlling the pulse duration of the electrical power supplied by said connecting means to said transducer.

17. A device to be used for delivering ultrasonic therapy to the tissue of a human body wherein said tissue has changing load characteristics, comprising:
means for establishing a pulse period,
means for establishing a desired pulse duration within said pulse period,
means for establishing a desired level of output power,
means for generating output power pulses to be repetitively supplied to an ultrasonic transducer during the established pulse duration,
means for continuously sensing instantaneous output voltage and current,
means for continuously forming a feedback signal proportional to a product of said instantaneous output voltage and current,
means for comparing said established desired level of output power to said feedback signal including means for generating an error signal proportional thereto,
means to adjusting said output pulses to minimize said error signal in response to said changing tissue load.

18. A control system for supplying a selected level of output power, on a repetitive basis to a changing load comprising:
means for selecting the desired level of output power,
means for establishing a repetition rate, means for selecting a time duration within said repetition rate to generate the desired level of output power, means for generating essentially sinusoidal output voltage and current to be supplied to the load, means for instantaneously sensing said essentially sinusoidal output voltage and current and for instantaneously forming a feedback signal proportional to the product thereof corresponding to actual output power, means for comparing said formed feedback signal to said selected level of output power including means for forming an error signal proportional thereto, and means for sensing said error signal and for adjusting said means for generating to minimize differences between said selected output power and the actual output power in response to said changing load.

19. The method according to claim 13, including the further steps of:

establishing and electronically sensing a first output voltage and current repetition rate for pulsed generation of said output voltage and current, manually selecting and electronically sensing a first output voltage and current repetition rate for pulsed generation of said output voltage and current, manually selecting and electronically sensing a pulse width for said pulsed generation of said output voltage and current limiting generation of the output voltage and current to a period of time corresponding to the sensed pulse width, and periodically repeating generating said limited output voltage and current at said first repetition rate.

20. The method according to claim 19, wherein the step of generating comprises:

generating an essentially sinusoidal output voltage and current of a selected frequency.

* * * * *